(12) United States Patent
Nikaya et al.

(10) Patent No.: US 6,255,393 B1
(45) Date of Patent: Jul. 3, 2001

(54) AQUEOUS POLYMER DISPERSION, PRODUCTION PROCESS THEREFOR, AND AQUEOUS RELEASE AGENT

(75) Inventors: Toshiki Nikaya, Kobe; Ichimoto Akasaki, Otsu, both of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/415,661

(22) Filed: Oct. 12, 1999

(30) Foreign Application Priority Data

Oct. 22, 1998 (JP) .................................................. 10-300891

(51) Int. Cl.$^7$ ................................. C08F 2/16; C08J 3/03; C08L 51/06

(52) U.S. Cl. ..................... 525/123; 525/328.2; 525/399; 524/589; 524/591; 524/839; 523/501

(58) Field of Search .................................. 525/123, 328.2, 525/399; 524/589, 591, 839; 523/501

(56) References Cited

U.S. PATENT DOCUMENTS

| | | |
|---|---|---|
| 5,278,228 | 1/1994 | Matner et al. . |
| 5,413,815 | 5/1995 | Williams et al. . |
| 5,449,707 | 9/1995 | Higashiura et al. . |
| 5,484,841 | * 1/1996 | Kodama et al. ...................... 524/589 |
| 5,633,328 | 5/1997 | Tsujinaka et al. . |

FOREIGN PATENT DOCUMENTS

| | | |
|---|---|---|
| 0 405 317 | 1/1991 | (EP) . |
| 0 409 218 | 1/1991 | (EP) . |
| 40-17661 | 8/1965 | (JP) . |
| 03050232A | * 3/1991 | (JP) . |
| 3-50279 | 3/1991 | (JP) . |
| 3-86776 | 4/1991 | (JP) . |
| 3-86777 | 4/1991 | (JP) . |
| 05078540A | * 3/1993 | (JP) . |
| 9-29756 | 2/1997 | (JP) . |
| 9-104851 | 4/1997 | (JP) . |
| 9-188868 | 7/1997 | (JP) . |
| 10-114847 | 5/1998 | (JP) . |

* cited by examiner

*Primary Examiner*—Nathan M. Nutter
*Assistant Examiner*—Olga Asinovsky

(57) ABSTRACT

The present invention provides an aqueous polymer dispersion which is advantageous in that the coating film as formed therefrom has excellent heat resistance even after being preserved at high temperature, and further has excellent transparency without possibility of becoming white turbid even when the drying temperature during the formation of the coating film is a low temperature of not higher than 100° C., and in that, when used as a release agent, the aqueous polymer dispersion will be an aqueous release agent which undergoes no deterioration of the releasability even after being preserved at high temperature, and further, has excellent transparency. In the aqueous polymer dispersion, particles of grafted polymer (b) are dispersed in water, wherein grafted polymer (b) includes backbone polymer (a) and a hydrocarbon group with not fewer than 8 carbon atoms in a side chain, with the aqueous polymer dispersion being characterized in that: backbone polymer (a) has a weight-average molecular weight of not less than 20,000, and/or grafted polymer (b) has a viscosity of not lower than 50 mP·s at 60° C. in the form of a toluene solution as diluted to 40 weight %, and further in that the particles of grafted polymer (b) are finely dispersed in water in a state of the volume-average partide diameter less than 0.3 μm.

8 Claims, 2 Drawing Sheets

AQUEOUS POLYMER DISPERSION, PRODUCTION PROCESS THEREFOR, AND AQUEOUS RELEASE AGENT

BACKGROUND OF THE INVENTION

A. Technical Field

The present invention relates to an aqueous polymer dispersion, a production process therefor, and an aqueous release agent, and more specifically, relates to: for example, an aqueous release agent, an aqueous blocking-resisting agent, an aqueous smoothing agent, and an aqueous water repelling agent, which are used for paper or various plastic base materials such as poly(vinyl chloride) and polyolefins, particularly, an aqueous release agent which is favorably used to protect or preserve a pressure sensitive adhesive product having a coat of a pressure sensitive adhesive; an aqueous polymer dispersion for producing the aqueous release agent; and a production process for the aqueous polymer dispersion.

B. Background Art

In pressure sensitive adhesive products such as pressure sensitive adhesive tapes and sheets, generally, a release sheet is attached to an adhesive face, or the pressure sensitive adhesive product is wound into a roll to attach the adhesive face to the back face of a carrier, for the purpose of protecting the adhesive face. A release agent is coated onto a release face of the release sheet or onto the back face of the carrier, for the purpose of obtaining good releasability when being used.

Silicone release agents, or release agents comprising polymers with long-chain hydrocarbon groups such as long-chain alkyl groups (which hereinafter might be referred to as "long-chain alkyl release agents" for briefness), have been proposed as the above release agents so far. In recent years, attention is attracted to the long-chain alkyl release agents among them, because the long-chain alkyl release agents have more excellent re-adhesion, writability, and printability than the silicone release agents. JP-B-40-017661 proposes a pressure sensitive adhesive product in which a polymer as obtained by grafting an alkyl isocyanate upon polyethylenimine is used as a solvent type release agent.

Furthermore, JP-A-03-050279, JP-A-03-086776, and JP-03-086777 propose arts to make the long-chain alkyl release agent aqueous, considering the work environment or the environmental pollution. That is to say, these are arts in which an aqueous dispersion of a long-chain alkyl grafted polymer is obtained by a specific process comprising the step of reacting raw materials under stirring in water, or post-emulsifying a polymer, and the resultant aqueous dispersion is used as the release agent.

The aqueous release agents comprising aqueous dispersions of long-chain alkyl grafted polymers, as proposed in the above prior arts, exhibit excellent releasability at normal temperature in respect to having little release resistance and not deteriorating the adhesion of the pressure sensitive adhesive layer. However, the above conventional aqueous release agents have problems of heat resistance in that, after being preserved at high temperature in a state of being attached to the adhesive face, they easily transfer to the pressure sensitive adhesive layer, so the adhesion of the pressure sensitive adhesive layer deteriorates or the release force increases. In addition, especially in the case where the drying temperature of the release agent during the formation of the release agent layer is a low temperature of not higher than 100° C., there are also problems in that the release agent layer easily becomes white turbid, so the transparency of the pressure sensitive adhesive product is damaged due to the release agent when a transparent carrier is used.

SUMMARY OF THE INVENTION

A. Object of the Invention

An object of the present invention is to provide an aqueous polymer dispersion which is advantageous in that the coating film as formed therefrom has excellent heat resistance even after being preserved at high temperature, and further has excellent transparency without possibility of becoming white turbid even when the drying temperature during the formation of the coating film is a low temperature of not higher than 100° C., and in that, when used as a release agent, the aqueous polymer dispersion will be an aqueous release agent which undergoes no deterioration of the releasability even after being preserved at high temperature, and further, has excellent transparency.

B. Disclosure of the Invention

To solve the above problems, the present invention provides an aqueous polymer dispersion, a production process therefor, and an aqueous release agent comprising this aqueous polymer dispersion as follows.

"An aqueous polymer dispersion, in which particles of grafted polymer (b) are dispersed in water, wherein grafted polymer (b) includes backbone polymer (a) and a hydrocarbon group with not fewer than 8 carbon atoms in a side chain, with the aqueous polymer dispersion being characterized in that: backbone polymer (a) has a weight-average molecular weight of not less than 20,000, and the particles of grafted polymer (b) are finely dispersed in water in a state of the volume-average article diameter less than 0.3 μm."

"An aqueous polymer dispersion, in which particles of grafted polymer (b) are dispersed in water, wherein grafted polymer (b) includes backbone polymer (a) and a hydrocarbon group with not fewer than 8 carbon atoms in a side chain, with the aqueous polymer dispersion being characterized in that: grafted polymer (b) has a viscosity of not lower than 50 mP·s at 60° C. in the form of a toluene solution as diluted to 40 weight %, and the particles of grafted polymer (b) are finely dispersed in water in a state of the volumeaverage particle diameter less than 0.3 μm."

"A production process for an aqueous polymer dispersion in which particles of grafted polymer (b) are dispersed in water, wherein grafted polymer (b) includes backbone polymer (a) and a hydrocarbon group with not fewer than 8 carbon atoms in a side chain, with the production process for the aqueous polymer dispersion being characterized by comprising the step of press-feeding grafted polymer (b) together with water under high pressure to subject grafted polymer (b) to a finely dispersing treatment."

These and other objects and the advantages of the present invention will be more fully apparent from the following detailed disclosure.

DETAILED DESCRIPTION OF THE INVENTION

Figure 1:
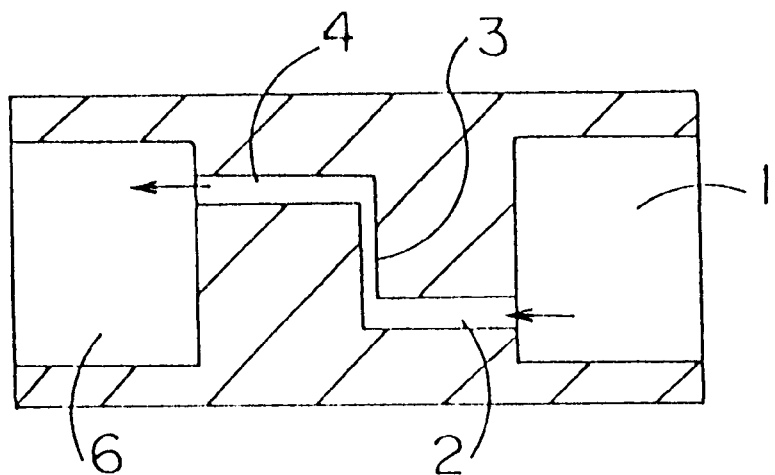
FIG. 1 is a schematic section to show an example of the first dispersion part of a high pressure homogenizer as used in the present invention.

The present inventors found that (1) the weight-average molecular weight of backbone polymer (a), as used as a raw material of grafted polymer (b), and/or (2) the viscosity of grafted polymer (b) in the form of a diluted toluene solution, and further, (3) the dispersed state of grafted polymer (b) in water were very closely relevant to the heat resistance and transparency of the coating film as formed from the aqueous polymer dispersion. Thus, the present inventors further studied diligently.

As to the weight-average molecular weight of backbone polymer (a), it is important that its value is not less than 20,000. The use of backbone polymer (a) with a high molecular weight would enhance the molecular weight of the resultant grafted polymer (b). It is important that grafted polymer (b) has a viscosity of not lower than 50 mP·s at 60° C. in the form of a toluene solution as diluted to 40 weight %. If backbone polymer (a) has a weight-average molecular weight of not less than 20,000 and/or if grafted polymer (b) has a viscosity of not lower than 50 mP·s at 60° C. in the form of a toluene solution as diluted to 40 weight %, then the abilities of the finally resulting release agent, especially, heat resistance, are enhanced. Next, as to the dispersed state of grafted polymer (b) in water, if grafted polymer (b) is dispersed in a state of extremely fine particles with a volume-average particle diameter less than 0.3 μm, and further, if grafted polymer (b) is dispersed in a state of the ratio "(standard deviation of volume-average particle diameter)/(volume-average particle diameter)" of not higher than 0.5 as well as the volume-average particle diameter less than 0.3 μm, then there can be obtained the aqueous polymer dispersion which has very excellent heat resistance and transparency of the coating film as formed therefrom and which is useful, for example, as a release agent.

If the volume-average particle diameter of grafted polymer (b) were made small, the uniformity of the release agent film as formed on the carrier might generally tend to be improved to enhance both the heat resistance and the transparency. However, as to aqueous dispersions of a finely dispersed state (about 1 μm) to such an extent as can considerably easily be realized with dispersing machines (e.g. homomixers) which have conventionally been used in this field, the heat resistance or transparency thereof are hardly enhanced in comparison with those of aqueous dispersions having larger particle diameters. Therefore, even if aqueous dispersions were allowed to fall in a more finely dispersed state, it would never be expected to greatly enhance both the heat resistance and the transparency. In addition, in the case where backbone polymer (a) with a high weight-average molecular weight or grafted polymer (b) with a high viscosity in the form of a diluted toluene solution is used, it is difficult to achieve the finely dispersed state with the dispersing machines which are commonly used in this field. Thus, in the actual state of things, it has not been studied to produce the aqueous dispersion of the finely dispersed state of which the effect is not expectable very much and further of which the realization is difficult according to backbone polymer (a) or grafted polymer (b) as used, but attempts have been made to enhance the heat resistance or transparency of the release agent by other methods, for example, methods in which the type or amount of backbone polymer (a), as used as a raw material, or that of a compound with a hydrocarbon group, as used to introduce the hydrocarbon group into a side chain of backbone polymer (a), is changed, or reaction conditions such as reaction temperature or time are changed, or various additives are added.

Contrary to the above circumstances, the present inventors diligently studied about the production process for an aqueous dispersion of a finely dispersed state and, as a result, found that if the treatment liquid is press-fed, preferably under a high pressure of not lower than 100 kgf/cm², with a specific dispersing machine having a principle to press-feed the treatment liquid under high pressure, then an aqueous dispersion of very fine particles can be obtained even when backbone polymer (a) with a high weight-average molecular weight or grafted polymer (b) with a high viscosity in the form of a diluted toluene solution is used. Furthermore, the present inventors found that the heat resistance and transparency of the release agent are greatly enhanced with the volume-average particle diameter less than 0.3 μm bordered if backbone polymer (a) has a weight-average molecular weight of not less than 20,000 and/or if grafted polymer (b) has a viscosity of not lower than 50 mP·s at 60° C. in the form of a toluene solution as diluted to 40 weight %: in other words, the "weight-average molecular weight of not less than 20,000 of backbone polymer (a)" and/or the "viscosity of not lower than 50 mP·s of grafted polymer (b) at 60° C. in the form of a toluene solution as diluted to 40 weight %," and further, the "volume-average particle diameter of 0.3 μm" are critically significant numerical values. Thus, the present invention has been completed.

Hereinafter, the present invention is explained in detail.

Grafted polymer (b) in the present invention includes backbone polymer (a) and a hydrocarbon group with not fewer than 8 carbon atoms in a side chain, and may be a product either by a process including the step of grafting a compound having a hydrocarbon group with not fewer than 8 carbon atoms upon backbone polymer (a), or by a process including the step of polymerizing a compound having a hydrocarbon group with not fewer than 8 carbon atoms.

Backbone polymer (a), as used in the process including the step of grafting the compound having a hydrocarbon group with not fewer than 8 carbon atoms upon backbone polymer (a), is preferably at least one member selected from the group consisting of polyamines and polyols. These polymers can preferably be used either alone respectively or in combinations with each other.

The polyamine is a compound that has at least two amino groups containing active hydrogen (primary amino group ($-NH_2$) and/or secondary amino group ($-NH-$)). The amino group containing active hydrogen is a reaction site of the polyamine and reacts with a compound which has a functional group reactable with the active hydrogen of the amino group and further has a hydrocarbon group with not fewer than 8 carbon atoms. The amino group containing active hydrogen may be included either in a backbone polymer of the polyamine or in a side chain of the polyamine. In addition, even if the polyamine further has a functional group containing active hydrogen that derives from other than the amino group, no hindrance is provided. Examples of such polyamines include polyalkylenimines, polyalkylenepolyamines, polyvinylamines, and polyallylamines. These polyamines may be used either alone respectively or in combinations with each other.

The polyalkylenimine is, for example, generally produced by a process comprising the step of ionically polymerizing an alkylenimine such as ethylenimine and propylenimine, or by a process comprising the step of polymerizing an alkyloxazoline and then partially or entirely hydrolyzing the resultant polymer. Examples of the polyalkylenimine include polyethylenimine, polypropylenimine, and polyethylenepropylenimine.

Specific examples of the polyalkylenepolyamine include diethylenetriamine, triethylenetetramine, pentaethylenehexamine, and products by reactions of ethylenediamine and polyfunctional compounds. The polyvinylamine is, for example, obtainable by a process comprising the step of polymerizing N-vinylformamide to form poly(N-vinylformamide) and then partially or entirely hydrolyzing this poly(N-vinylformamide) with acids such as hydrochloric acid, but the production process is not especially limited thereto.

The polyallylamine is generally obtainable by a process comprising the step of polymerizing a hydrochloride of an allylamine monomer and then removing hydrochloric acid, but the production process is not especially limited thereto.

The polyamine may be a product by a process including the step of modification with a compound having a functional group reactable with the amino group of the polyamine, such as alkylene oxide, but, in such a case, it is preferable that the amino group containing active hydrogen, which reacts with the compound having a functional group reactable with the active hydrogen of the amino group and further having a hydrocarbon group with not fewer than 8 carbon atoms, remains in the ratio of not less than 50 mol %, more preferably not less than 60 mol %, in the polyamine. When the amino group containing active hydrogen remains in the ratio less than 50 mol %, the releasability of the release agent is low.

When the polyamine is a polymer, it may contain a monomer unit free from amino group, but preferably contains, in the ratio of not less than 50 mol %, more preferably not less than 60 mol %, a monomer unit that has the amino group containing active hydrogen which reacts with the compound having a functional group reactable with the active hydrogen of the amino group and further having a hydrocarbon group with not fewer than 8 carbon atoms. In the case where the content of the monomer unit that has the amino group containing active hydrogen is less than 50 mol %, the releasability of the release agent is low.

The polyol is a compound having at least two hydroxyl groups (—OH groups). The hydroxyl group is a reaction site of the polyol and reacts with a compound which has a functional group reactable with the active hydrogen of the hydroxyl group and further has a hydrocarbon group with not fewer than 8 carbon atoms. In addition, even if the polyol further has a functional group containing active hydrogen that derives from other than the hydroxyl group, no hindrance is provided. Examples of such polyols include: products by saponification of poly(vinyl acetate); (co) polymers of hydroxyl-group-containing monomers; polysaccharides; and polyesterpolyol. These polyols may be used either alone respectively or in combinations with each other.

The product by saponification of poly(vinyl acetate) is a product by partial or entire saponification of poly(vinyl acetate). The saponification degree of the product by saponification of poly(vinyl acetate) is preferably not less than 50 mol %, more preferably not less than 60 mol %. In the case where the saponification degree is less than 50 mol %, the amount of reactive hydroxyl group is so small that the releasability of the release agent is low. Examples of poly (vinyl acetate) which has not yet been saponified include homopolymers of vinyl acetate and copolymers of vinyl acetate and monomers copolymerizable therewith, such as homopolymers of vinyl acetate, vinyl acetate-ethylene copolymers, and copolymers of vinyl acetate and acrylic monomers.

Examples of the above hydroxyl-group-containing monomer include 2-hydroxyethyl (meth)acrylate, hydroxypropyl (meth)acrylate, polyoxyethylene (meth)acrylate, a-hydroxymethyl (meth)acrylate, and N-methylol(meth) acrylamide.

In the present invention, the polyalkylenimine and the product by saponification of poly(vinyl acetate) are preferably used as backbone polymer (a).

In the present invention, it is important that what has a weight-average molecular weight of not less than 20,000 is used as backbone polymer (a), and the weight-average molecular weight is preferably in the range of 20,000 to 1,000,000, and more preferably 20,000 to 500,000. In the case where the weight-average molecular weight of backbone polymer (a) is less than 20,000, the releasibility of the release agent, especially, heat resistance, is low. In the case where the weight-average molecular weight of backbone polymer (a) is more than 1,000,000, it is so difficult to realize the volume-average particle diameter less than 0.3 $\mu$m even with a high pressure homogenizer that the abilities of the release agent, especially, transparency of the release agent layer, is low.

Examples of the functional group of the compound, having the functional group reactable with the active hydrogen of the amino group of the polyamine and further having a hydrocarbon group with not fewer than 8 carbon atoms, which is usable in the present invention, include aldehyde group, ketene group, acid halide group, isocyanate group, thioisocyanate group, unsaturated double bond, epoxy group, carboxyl group, acid anhydride group, acyl halide group, active ester group, and aziridinyl group. The compound, having the functional group reactable with the active hydrogen of the amino group and further having a hydrocarbon group with not fewer than 8 carbon atoms, is not especially limited, but those which have the isocyanate group are preferably usable.

Examples of the functional group of the compound, having the functional group reactable with the active hydrogen of the hydroxyl group of the polyol and further having a hydrocarbon group with not fewer than 8 carbon atoms, include aldehyde group, ketene group, acid halide group, isocyanate group, thioisocyanate group, epoxy group, carboxyl group, acid anhydride group, and acyl halide group. The compound, having the functional group reactable with the active hydrogen of the hydroxyl group and further having a hydrocarbon group with not fewer than 8 carbon atoms, is not especially limited, but those which have the isocyanate group are preferably usable.

The isocyanate group is a reaction site of isocyanate compound and reacts with an amino or hydroxyl group which backbone polymer (a) has. Examples of the hydrocarbon group include aliphatic hydrocarbon groups, aromatic hydrocarbon groups, and aromatic-ring-containing aliphatic hydrocarbon groups, but the aliphatic hydrocarbon groups are preferable for the releasability. Examples of the aliphatic hydrocarbon group with not fewer than 8 carbon atoms include saturated linear alkyl groups, unsaturated linear alkyl groups, branched alkyl groups, and cyclic alkyl groups with not fewer than 8 carbon atoms. Among them, the saturated linear alkyl groups with not fewer than 8 carbon atoms are preferable, and saturated linear alkyl groups with 12 to 22 carbon atoms are particularly preferable. Isocyanate compounds having an aliphatic hydrocarbon group other than saturated linear alkyl groups have the disadvantage of enlarging the release resistance value. In addition, isocyanate compounds having an alkyl group with not more than 7 carbon atoms have the disadvantage of enlarging the release resistance value of the resultant release agent, therefore, spoiling the releasability. Isocyanate compounds having an alkyl group with not fewer than 23 carbon atoms have the abilities equal to isocyanate compounds having an alkyl group with not more than 22 carbon atoms, but actually have the disadvantage of high price. Monoisocyanate compounds having an alkyl group with 12 to 22 carbon atoms are preferably used among the isocyanate compounds having an alkyl group with 12 to 22 carbon atoms. Specific examples thereof include dodecyl isocyanate, tridecyl isocyanate, tetradecyl isocyanate, pentadecyl isocyanate, hexadecyl isocyanate, octadecyl isocyanate, nonadecyl isocyanate, and eicosyl isocyanate, but polyisocyanate compounds such as diisocyanate compounds and triisocyanate compounds may be used. These isocyanate compounds may be used either alone respectively or in combinations with each other.

In the process including the step of polymerizing the compound having a hydrocarbon group with not fewer than 8 carbon atoms, an aziridine ring of a product by a reaction between an alkylenimine and a compound having a functional group reactable with active hydrogen of the alkylenimine and further having a hydrocarbon group with not fewer than 8 carbon atoms may be ionically polymerized by ring opening, or a polymerizable unsaturated bond of a product by a reaction between a monomer having a polymerizable unsaturated bond as well as a hydroxyl group and a compound having a functional group reactable with active hydrogen of the hydroxyl group and further having a hydrocarbon group with not fewer than 8 carbon atoms may be radically polymelized.

Examples of the alkylenimine include ethylenimine, propylenimine, and dimethylethylenimine. These alkylenimines may be used either alone respectively or in combinations with each other.

Examples of the monomer having a polymerizable unsaturated bond as well as a hydroxyl group include the above hydroxyl-group-containing monomers. These hydroxyl-group-containing monomers may be used either alone respectively or in combinations with each other.

Examples of the functional group reactable with the active hydrogen of the alkylenimine include aldehyde group, ketene group, acid halide group, isocyanate group, thioisocyanate group, unsaturated double bond, epoxy group, carboxyl group, acid anhydride group, acyl halide group, and active ester group. The compound, having the functional group reactable with the active hydrogen of the alkylenimine and further having a hydrocarbon group with not fewer than 8 carbon atoms, is not especially limited, but those which have the isocyanate group are preferably usable. The isocyanate group is a reaction site of isocyanate compound and reacts with the active hydrogen of the alkylenimine. The above monoisocyanate compounds having an alkyl group with 12 to 22 carbon atoms are preferable among the isocyanate compounds having a hydrocarbon group with not fewer than 8 carbon atoms. These isocyanate compounds may be used either alone respectively or in combinations with each other.

Examples of the functional group reactable with the active hydrogen of the hydroxyl-group-containing monomer include aldehyde group, ketene group, acid halide group, isocyanate group, thioisocyanate group, unsaturated double bond, epoxy group, carboxyl group, acid anhydride group, and acyl halide group. The compound, having the functional group reactable with the active hydrogen of the hydroxyl-group-containing monomer and further having a hydrocarbon group with not fewer than 8 carbon atoms, is not especially limited, but those which have the isocyanate group are preferably usable. The isocyanate group is a reaction site of isocyanate compound and reacts with the active hydrogen of the hydroxyl-group-containing monomer. The above monoisocyanate compounds having an alkyl group with 12 to 22 carbon atoms are preferable among the isocyanate compounds having a hydrocarbon group with not fewer than 8 carbon atoms. These isocyanate compounds may be used either alone respectively or in combinations with each other.

In the present invention, grafted polymer (b) may be a product either by a process including the step of grafting a compound having a hydrocarbon group with not fewer than 8 carbon atoms upon backbone polymer (a), or by a process including the step of polymerizing a compound having a hydrocarbon group with not fewer than 8 carbon atoms. But the process including the step of grafting a compound having a hydrocarbon group with not fewer than 8 carbon atoms upon backbone polymer (a) is preferable. In addition, the combination of backbone polymer (a) and the compound having a hydrocarbon group with not fewer than 8 carbon atoms is not especially limited, but the combination of polyalkylenimine and octadecyl isocyanate is preferable, and the combination of polyethylenimine and octadecyl isocyanate is particularly preferable.

Next, an explanation is made about a process in which grafted polymer (b), having a hydrocarbon group with not fewer than 8 carbon atoms in a side chain, is produced by an addition reaction of the isocyanate compound to the above backbone polymer (a) in the present invention. When the isocyanate compound is grafted upon the polyamine, an urea bond is formed by a reaction of an amino group of the polyamine and an isocyanate group of the isocyanate compound. In the reaction of the polyol and the isocyanate compound, an urethane bond is formed by a reaction of a hydroxyl group of the polyol and an isocyanate group of the isocyanate compound. The process for the reaction of backbone polymer (a) and the isocyanate compound is not especially limited, and the reaction may be carried out in an organic solvent or an aqueous medium, or without solvent. But a process in which the reaction is carried out in an organic solvent is preferably employed. A particularly preferable one is a process comprising the steps of dissolving backbone polymer (a) into an organic solvent to obtain a solution of backbone polymer (a), and then adding the isocyanate compound to this solution to react them. The organic solvent as used therein is not especially limited if in the reaction of backbone polymer (a) and the isocyanate compound the organic solvent can uniformly disperse or dissolve backbone polymer (a), and further, does not react with the isocyanate compound, but can uniformly dissolve the isocyanate compound and the resulting grafted polymer (b). Examples of the organic solvent include: aromatic hydrocarbons, such as toluene and xylene; aliphatic hydrocarbons, such as hexane; esteric aliphatic hydrocarbons, such as ethyl acetate and butyl acetate; and alicyclic hydrocarbons, such as cyclohexane. These organic solvents may be used either alone respectively or in combinations with each other. In the present invention, the organic solvent is not especially limited, but the aromatic hydrocarbons are preferably used.

The temperature for the reaction of backbone polymer (a) and the isocyanate compound is favorably in the range of 10~130° C. In addition, as to the ratio of the isocyanate compound to backbone polymer (a), the value of the product from the value of mol %/100 of the amino or hydroxyl group containing active hydrogen in backbone polymer (a) and from the molar ratio of the isocyanate compound to the amino or hydroxyl group of backbone polymer (a) is preferably in the range of 0.2~1.0, more preferably 0.3~1.0. In the case where the value of the product is smaller than 0.2, the number of molecules of the isocyanate compound as added to one molecule of backbone polymer (a) is so small that the release resistance value of the resultant release agent is large. In addition, in the case where the value of the product exceeds 1.0, the isocyanate compound exists so excessively that the unreacted isocyanate compound or its by-products remain in the release agent. In the case where such a release agent is used to protect or preserve pressure sensitive adhesive products, the above residues transfer to the adhesive face to deteriorate the adhesion of the adhesive face.

In the present invention, it is important that grafted polymer (b) has a viscosity of not lower than 50 mP·s at 60° C. in the form of a toluene solution as diluted to 40 weight %. This viscosity is preferably in the range of 500 to 100,000 mP·s, more preferably 1,000 to 20,000 mP·s. If grafted polymer (b) has a viscosity of not lower than 50 mP·s at 60° C. in the form of a toluene solution as diluted to 40 weight %, then the releasibility of the finally resulting release agent, especially, heat resistance, is excellent.

The cause of this effect is not clear, but it would be considered as follows: the "viscosity of not lower than 50 mP·s of grafted polymer (b) at 60° C. in the form of a toluene solution as diluted to 40 weight %" further shows that the molecular weight as based on backbone polymer (a) of the resulting grafted polymer (b) is higher than the molecular weights of those which have a viscosity lower than 50 mP·s; and effects of the conversion of grafted polymer (b) into a high-molecular one, such as toughening of the release agent layer due to the increase of tangling of molecules of grafted polymer (b) forming the release agent layer, or the reduction of the absolute amount of low-molecular grafted polymer (b) which can be a component transferring to the pressure sensitive adhesive layer, are combined with each other to produce excellent heat resistance.

In the present invention, grafted polymer (b), as obtained above, is subjected to a finely dispersing treatment with a specific dispersing machine having a principle to press-feed grafted polymer (b) together with water under high pressure. The dispersing machine is not especially limited if it is a dispersing machine having a principle to press-feed raft polymer (b) together with water under high pressure. But a high pressure homogenizer is preferably used. There is no hindrance even if the treatment liquid comprising grafted polymer (b) and water is directly subjected to the finely dispersing treatment. But, for enhancing the efficiency of the finely dispersing treatment, it is preferable that grafted polymer (b) is premixed with water and thereby dispersed into water to prepare a premixed liquid, which is then subjected to a finely dispersing treatment.

The high pressure homogenizer, as used in the present invention, is a dispersing machine to press-feed the treatment liquid (the above premixed liquid in the present invention), preferably under a high pressure of not lower than 100 kgf/cm$^2$, at least once, thereby applying at least one of cavitation, turbulence, shear, and impact to the treatment liquid to produce a finely dispersed state efficiently in a short time. The pressure of the high pressure homogenizer is preferably in the range of 100 to 5,000 kgf/cm$^2$, more preferably 300 to 3,000 kgf/cm$^2$. In the case where the pressure of the high pressure homogenizer is lower than 100 kgf/cm$^2$, it is difficult to obtain the aimed finely dispersed state. In addition, the members of the high pressure homogenizer greatly wear off under high pressure exceeding 5,000 kgf/cm$^2$. The number of times of the press-feed is at least one, and the treatment may be carried out repeatedly one or more times until the treatment liquid falls into a desired finely dispersed state. Examples of the high pressure homogenizer, usable in the present invention, include High Pressure Homogenizer (made by Izumi Food Machinery Co., Ltd.), High Pressure Homogenizer (made by Rannie Co., Ltd.), Microfluidizer (made by Microfluidics Co., Ltd.), Nanomizer (made by Nanomizer Co., Ltd.), Genus PY (made by Genus Co., Ltd.), and System Organizer DeBEE (made by Kewpie Co., Ltd.).

Figure 2:
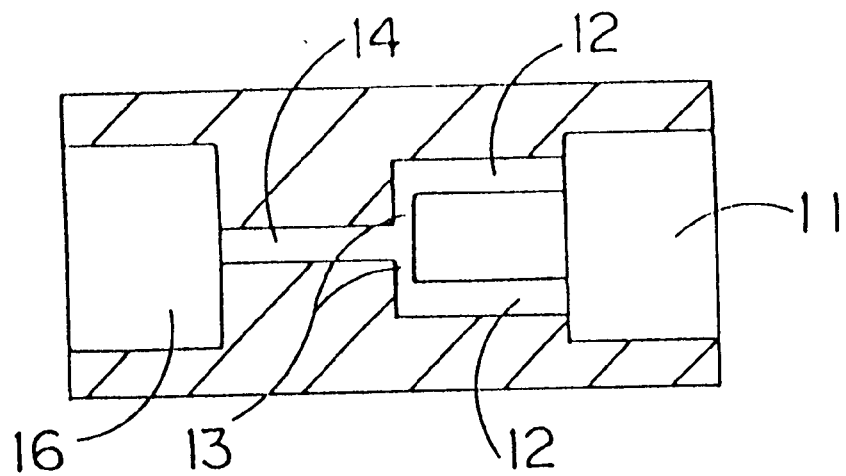
FIG. 2 is a schematic section to show an example of the second dispersion part of a high pressure homogenizer as used in the present invention.
Figure 3:
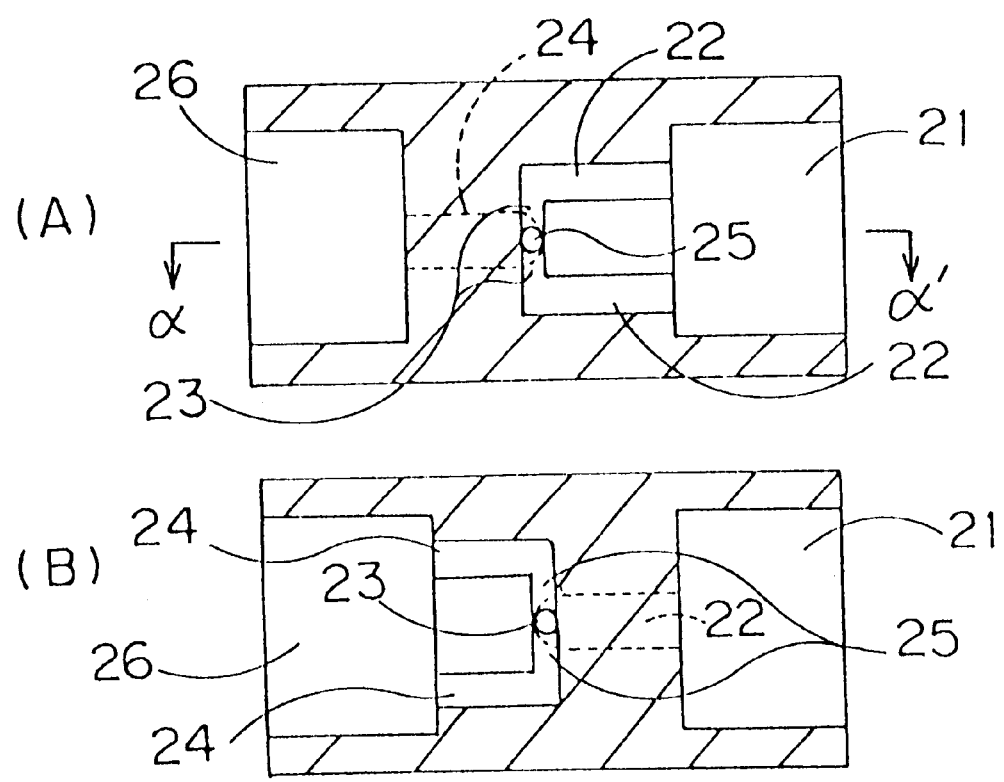
FIG. 3 is a schematic section to show an example of the third dispersion part of a high pressure homogenizer as used in the present invention.

Examples of particularly preferable high pressure homogenizers include a high pressure homogenizer as equipped with three dispersion parts as shown in FIGS. 1 to 3, but the structures of the dispersion parts are not limited to those which are shown in FIGS. 1 to 3, and they may be dispersion parts with such structures as can apply similar dispersion energy by press-feeding.

An example of the first dispersion part is shown in FIG. 1. As is seen in FIG. 1, the first dispersion part includes an introduction path 1, a first dispersion flow path 2, a second dispersion flow path 3, and a discharge path 4. The first dispersion flow path 2 is connected to the introduction path 1 and formed straightly and continuously from a terminal of the introduction path 1. The first dispersion flow path 2 has a smaller section area than the introduction path 1. The second dispersion flow path 3 is connected to the first dispersion flow path 2 and formed by cranking at a terminal of the first dispersion flow path 2. The second dispersion flow path 3 has a smaller section area than the first dispersion flow path 2. The discharge path 4 is connected to the second dispersion flow path 3 and formed by cranking at a terminal of the second dispersion flow path 3. The treatment liquid is introduced into the introduction path 1 and then supplied into the first dispersion flow path 2 in the high pressure homogenizer under pressure. The supplied treatment liquid passes through the first dispersion flow path 2, and then collides with a wall, as cranked at a terminal of the first dispersion flow path 2, and then enters the second dispersion flow path 3. The treatment liquid, as entered the second dispersion flow path 3, passes through the second dispersion flow path 3, and then collides with a wall, as cranked at a terminal of the second dispersion flow path 3, and then passes through the discharge path 4, and is then discharged outside. The section areas of the first and second dispersion flow paths are set fitly to achieve a desired pressure.

An example of the second dispersion part is shown in FIG. 2. As is seen in FIG. 2, the second dispersion part includes an introduction path 11, first dispersion flow paths 12, a second dispersion flow path 13, and a discharge path 14. The first dispersion flow paths 12 are branched at a terminal of the introduction path 11 and formed straightly and continuously from the terminal of the introduction path 11. The first dispersion flow paths 12 have a smaller section area than the introduction path 11. The second dispersion flow path 13 is connected to the first dispersion flow paths 12 and formed by cranking at terminals of the first dispersion flow paths 12. The second dispersion flow path 13 has a smaller section area than the first dispersion flow paths 12. The discharge path 14 is connected to the second dispersion flow path 13 and formed by cranking at an intermediate portion of the second dispersion flow path 13. The section areas of the first and second dispersion flow paths are set fitly to achieve a desired pressure.

An example of the third dispersion part is shown in FIG. 3. FIG. 3 (B) shows α–α' section of FIG. 3 (A). As is seen in FIG. 3, the third dispersion part includes an introduction path 21, first dispersion flow paths 22, a second dispersion flow path 23, a third dispersion flow path 25, and discharge paths 24. The first dispersion flow paths 22 are branched at a terminal of the introduction path 21 and formed straightly and continuously from the terminal of the introduction path 21. The first dispersion flow paths 22 have a smaller section area than the introduction path 21. The second dispersion flow path 23 is connected to the first dispersion flow paths 22 and formed by cranking at terminals of the first dispersion flow paths 22. The second dispersion flow path 23 has a smaller section area than the first dispersion flow paths 22. The third dispersion flow path 25 is formed by branching at an intermediate portion of the second dispersion flow path 23. The section area of the third dispersion flow path 25 is set to be the same as that of the second dispersion flow path 23. The discharge paths 24 are connected to the third dispersion flow path 25 and formed by cranking at terminals of the third dispersion flow path 25. The section areas of the first, second, and third dispersion flow paths are set fitly to achieve a desired pressure.

In the above first, second, and third dispersion parts, the treatment liquid is press-fed by being accelerated when passing through the first dispersion flow paths 2, 12, 22, the second dispersion flow paths 3, 13, 23, and the third dispersion flow path 25. The pressure, as applied to the treatment liquid when introducing it into the introduction path 1, is fitly set such that the above press-feed can be carried out under high pressure. The press-fed treatment liquid collides with walls or with itself in the above first, second, and third dispersion flow paths, whereby at least one of cavitation, turbulence, shear, and impact is applied to the treatment liquid, so that liquid drops of grafted polymer (b) are dispersed and pulverized, thereby fined. In this way, the aqueous dispersion, in which fine particles of grafted polymer (b) are dispersed in water, can be obtained.

Examples of commercially available high pressure homogenizers, as equipped with the above first to third dispersion parts, include high pressure homogenizers such as High Pressure Homogenizer (made by Rannie Co., Ltd.), Microfluidizer (made by Microfluidics Co., Ltd.), Nanomizer (made by Nanomizer Co., Ltd.), and Genus PY (made by Genus Co., Ltd.).

The treatment liquid, as used in the above finely dispersing treatment, is a product by mixing grafted polymer (b) with water, preferably, with water and a surfactant. Especially, it is preferable to mix an organic solvent solution of grafted polymer (b) with water and the surfactant. In a particularly preferable process, a solution of grafted polymer (b), as obtained by a reaction in an organic solvent, is mixed with an aqueous solution of the surfactant. A process in which a heat-melted product of grafted polymer (b) is mixed with water might also be exemplified, but such a process is unfavorable because the heat-melted product has a higher viscosity than the organic solvent solution and is therefore difficult to finely disperse. In the present invention, this tendency is more remarkable because backbone polymer (a) has a high molecular weight and/or because grafted polymer (b) has a high molecular weight. The aqueous solution of the surfactant, as mixed with the organic solvent solution of grafted polymer (b), may further contain solvents, such as organic solvents, other than water within the range having no influence upon the abilities of the release agent. The temperature for the finely dispersing treatment with the high pressure homogenizer is not especially limited, but is preferably in the range of 40~90° C. because in this range the viscosity of the organic solvent solution of grafted polymer (b) is so low that the finely dispersing treatment can more efficiently be carried out.

The amount of water, as used in the above finely dispersing treatment, is preferably in the range of 30~5,000 weight parts, more preferably 50~900 weight parts, per 100 weight parts of the organic solvent solution of grafted polymer (b). In the case where the amount of water is smaller than 30 weight parts, it is difficult to obtain a dispersion in a state where the organic solvent solution of grafted polymer (b) is dispersed in water (oil-in-water state), or the viscosity of the resultant dispersion is so high that the finely dispersing treatment is difficult. In the case where the amount of water is larger than 5,000 weight parts, the solid content in the resultant dispersion is low unfavorably for the production cost. The grafted polymer (b) content in the organic solvent solution of grafted polymer (b) is preferably in the range of 10~80 weight %, more preferably 20~70 weight %. In the case where the polymer content is less than 10 weight %, the solid content in the resultant dispersion is low unfavorably for the production cost. In the case where the polymer content is more than 80 weight %, the viscosity of the organic solvent solution of grafted polymer (b) is so high that the finely dispersing treatment is difficult.

In the above finely dispersing treatment, the surfactant is used for the main purpose of stabilizing the dispersion. Examples thereof include high molecular emulsifiers such as nonionic surfactants (e.g. polyoxyethylene nonyl phenyl ether and polyoxyethylene stearyl ether), anionic surfactants (e.g. sodium lauryl sulfate and sodium polyoxyethylene nonyl phenyl ether sulfate), and cationic surfactants (e.g. stearylamineacetate and stearyltrimethylammonium chloride). The amount of the surfactant, as used, is preferably in the range of 0.1~20 weight %, more preferably 1~10 weight %, most preferably 3~7 weight %, of grafted polymer (b). In the case where the amount of the surfactant, as used, is larger than the above ranges, the surfactant easily transfers to the adhesive face. In the case where the amount of the surfactant, as used, is smaller than the above ranges, the fine dispersion is impossible, or the dispersion stability tends to be low.

After the above finely dispersing treatment, the aimed aqueous polymer dispersion can be obtained by, if necessary, removing the organic solvent from the dispersion of grafted polymer (b) by methods such as heating under vacuum. In the aqueous polymer dispersion, grafted polymer (b) is finely dispersed in water in a state of fine particles with a volume-average particle diameter less than 0.3 μm, wherein the volume-average particle diameter is preferably not greater than 0.25 μm. In addition, in view of the heat resistance and transparency of the release agent, it is preferable that the particle diameter distribution of grafted polymer (b) is narrow. Specifically, the ratio "(standard deviation of volume-average particle diameter)/(volume-average particle diameter)" is preferably not higher than 0.5, more preferably not higher than 0.4.

The aqueous release agent according to the present invention comprises the above aqueous polymer dispersion. The aqueous polymer dispersion is included such that the solid content of grafted polymer (b) may be preferably in the range of 10~100 weight %, more preferably 50~100 weight %, of the solid content of the release agent.

As to the solvent in the aqueous release agent according to the present invention, water and hydrophilic organic solvents can be used. Preferably not less than 70 weight %, more preferably not less than 90 weight %, of the solvent is water. Examples of usable hydrophilic organic solvents include isopropyl alcohol, ethanol, methanol, ethylene glycol, butyl cellosolve, butyl carbitol, and propylene glycol monomethyl ether.

For enhancing the heat resistance, it is preferable that the aqueous release agent according to the present invention further comprises an acid-containing polyolefin. The acid-containing polyolefin is a polyolefin containing an acid group such as carboxyl group or sulfonic acid group. Particularly, polyolefins containing a carboxyl group are preferable. The polyolefin containing a carboxyl group is, for example, obtained by (1) a process comprising the step of copolymerizing a monomer composition including an olefin (alkene) and an unsaturated carboxylic acid or by (2) a process comprising the step of oxidizing a polyolefin to form an oxide thereof, thus introducing a carboxyl group. In addition, as to the acid-containing polyolefin, commercially available ones can also be used.

In process (1) above, examples of the olefin include ethylene, propylene, and butadiene. Particularly, ethylene and propylene are preferable. Examples of the unsaturated carboxylic acid include: unsaturated monocarboxylic acids such as (meth)acrylic acid, cinnamic acid, and crotonic acid; and unsaturated dicarboxylic acids such as maleic acid, itaconic acid, and fumaric acid, and their monoesters. Among them, particularly, (meth)acrylic acid, cinnamic acid, and maleic acid are preferable.

In process (2) above, examples of the polyolefin include polyethylene and polypropylene. The method for oxidizing the polyolefin is not especially limited, and conventional ones can be employed.

As to the amount of the acid-containing polyolefin as used, the weight ratio of grafted polymer (b) to the acid-containing polyolefin is preferably in the range of 99:1~50:50, more preferably 90:10~60:40, in terms of solid content. Incidentally, the release agent according to the present invention may comprise grafted polymer (b) and the acid-containing polyolefin in the form of either a mixture or reaction product thereof.

The aqueous release agent according to the present invention may further comprise various additives such as crosslinking agents, wettability modifiers, leveling agents, defoaming agents, thickeners, and wetting agents, if necessary.

The aqueous release agent according to the present invention is coated to one face or both faces of a sheet-shaped or tape-shaped carrier and then dried, thereby enabling the production of a release sheet having a release agent layer as formed on the surface of the carrier. The coating amount is preferably in the range of 0.01~10 g/m$^2$, and the drying temperature is preferably in the range of 50~200° C., but they are not especially limited. Examples of the above carrier include: plastic films such as polyethylene, polypropylene, polyester, and cellophane; paper such as fine quality paper, kraft paper, crepe paper, and glassine paper; paper as treated with fillers, such as impregnated paper and plastic coat paper; woven or nonwoven fabrics of cotton or polyester. However, there is no especial limitation. The release sheet is attached to adhesive faces of pressure sensitive adhesive products in order to protect the adhesive faces. When using the pressure sensitive adhesive product, the release sheet is peeled off, and then the pressure sensitive adhesive product is, for example, attached to an adherend by pressing. In addition, in the case where the release agent layer is formed on the back face (the face opposite to the adhesive face) of the carrier of the pressure sensitive adhesive product, the pressure sensitive adhesive product is wound into a roll, thereby enabling the release agent layer to protect the adhesive face. When used, the pressure sensitive adhesive product is rewound in order from the outside.

Effects and Advantages of the Invention

The aqueous polymer dispersion, according to the present invention, is advantageous in that the coating film as formed therefrom has excellent heat resistance even after being preserved at high temperature, and further has excellent transparency without possibility of becoming white turbid even when the drying temperature during the formation of the coating film is a low temperature of not higher than 100° C., and in that, when used as a release agent, the aqueous polymer dispersion will be an aqueous release agent which undergoes no deterioration of the releasability even after being preserved at high temperature, and further, has excellent transparency. The aqueous release agent, according to the present invention, is a release agent to exhibit the abilities that are not inferior to those of organic solvent base release agents comprising long-chain alkyl grafted polymers.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to them.

Incidentally, the volume-average particle diameter of the release agent and the releasability and transparency of the release sheet were measured by the below-mentioned methods. In addition, in the examples and the comparative examples, unless otherwise noted, the units "part(s)" and "%" are by weight.

(1) Weight-average molecular weight of backbone polymer (a):

The weight-average molecular weight of backbone polymer (a) was measured by gel permeation chromatography (GPC) using pullulan as the standard substance of the molecular weight.

(2) Viscosity of organic solvent solution of grafted polymer (b):

The viscosity of organic solvent solution of grafted polymer (b) was measured by preparing a toluene solution of grafted polymer (b) as diluted to 40 weight %, and then measuring the viscosity of this toluene solution at 60° C. with a B type viscometer.

(3) Volume-average particle diameter and standard deviation thereof:

The volume-average particle diameter and the standard deviation thereof was measured with a laser diffraction/scattering type particle diameter distribution measurement apparatus, LA-910 (made by Horiba Seisakusho Co., Ltd.), in regard to the aqueous polymer dispersion under conditions of: number of times of data taking-in=20; form of distribution=standard; relative index of refraction=1.12; basis of particle diameter=volume.

(4) Releasability:

First of all, a release sheet was produced with a release agent and a biaxially extended polypropylene (hereinafter referred to as "OPP") film as the carrier in the following way. The release agent (solid content: 0.6%) was coated onto the corona-treated face (one face) of the OPP film using a #5 bar coater. The coating amount was set to be 0.05 g/m$^2$ in terms of solid content of the release agent. Next, the coating film was dried at 100° C. for 1 minute, thus producing the release sheet.

Next, Scotch Brand Tape #375 (hereinafter referred to as "pressure sensitive adhesive product A"), made by Sumitomo 3M Co., Ltd., was used as the pressure sensitive adhesive product. The release sheet was pressed onto pressure sensitive adhesive product A with a roller of its own weight of 2 kg in a state where the adhesive face of pressure sensitive adhesive product A and the release agent face of the release sheet could be face-to-face, thus attaching them to each other by pressing. Then, the release sheet was cut into the width (25 mm) of pressure sensitive adhesive product A to obtain test pieces.

Next, one of the resultant test pieces was left (preserved) in a thermohumidistat of temperature=25° C. and relative humidity=60% for 1 day. Thereafter, the initial release resistance value (g/25 mm) and the initial residual adhesion (g/25 mm) of the test piece were measured in a thermohumidistat of temperature=25° C. and relative humidity=60%. The release resistance value was measured by peeling off the release sheet from pressure sensitive adhesive product A under conditions of the peeling rate of 300 mm/min and 180°-peeling. In addition, the residual adhesion was measured by peeling off the release sheet from pressure sensitive adhesive product A, and then attaching pressure sensitive adhesive product A to a stainless panel, and then leaving them in a thermohumidistat of temperature=25° C. and relative humidity=60% for 20 minutes, and then peeling off pressure sensitive adhesive product A from the panel under conditions of the peeling rate of 300 mm/min and 180°-peeling.

In addition, another test piece, as obtained above, was left (preserved) in a thermohumidistat of temperature=65° C. and relative humidity=80% for 2 days. Thereafter, this test piece was left in a thermohumidistat of temperature=23° C. and relative humidity=80% for 4 hours. Then, the release resistance value (g/25 mm) and the residual adhesion (g/25 mm) were measured under the same conditions as mentioned above.

Incidentally, the adhesion of pressure sensitive adhesive product A was measured by attaching pressure sensitive adhesive product A to a stainless panel, and then peeling off pressure sensitive adhesive product A from the panel under conditions of the peeling rate of 300 mm/min and 180°-peeling. As a result, the adhesion was 1,600 g/25 mm.

(5) Appearance (transparency) of coating film:

A release sheet was produced in the same way as of the above releasability test. Then, the transparency of the coating film was observed with the eye under daylight. As a result, the case of transparency was evaluated as A; the case of a little white turbidity was evaluated as B; and the case of white turbidity was evaluated as C.

(6) Writability:

A release sheet was produced in the same way as of the above releasability test. Then, lines were drawn on the release agent face of the release sheet with a water base ink ball-point pen (Sign Pen (trademark), made by Pentel Co., Ltd.) to observe whether the water base ink was repelled by the release agent or not. The case where the ink was not repelled, therefore, drawing lines was possible, was evaluated as A; the case where the ink was a little repelled, but drawing lines was possible, was evaluated as B; and the case where the ink was repelled, therefore, drawing lines was impossible, was evaluated as C.

(7) Emulsion stability:

The release agent (solid content: 0.6%) was left in a thermostat of 23° C. for 7 days. Thereafter, the resultant coating liquid was observed with the eye to examine whether sedimentation or phase separation occurred or not. The case where neither sedimentation nor phase separation occurred was evaluated as A; and the case where sedimentation or phase separation occurred was evaluated as B.

SYNTHESIS EXAMPLE 1

Fifty parts of a 30% aqueous solution of polyethylenimine (weight-average molecular weight=290,000) and 144.5 parts of toluene were placed into a reaction vessel of the predetermined capacity as equipped with a stirrer, a condenser, a dropping funnel, and a thermometer, wherein the polyethylenimine was a product as synthesized by reacting ethylenimine and a primary or secondary amine compound in the presence of an acid polymerization catalyst in accordance with JP-B-49-033120. Then, water was removed by azeotropic dehydration, thus obtaining a toluene solution of the polyethylenimine.

Next, 81.3 parts of octadecyl isocyanate, as the isocyanate compound, was added to the resultant toluene solution of the polyethylenimine under heat reflux over a period of 1 hour, thus obtaining a toluene solution of grafted polymer (b) by an addition reaction of octadecyl isocyanate to polyethylenimine. Incidentally, the viscosity of the resultant 40% toluene solution of grafted polymer (b) was 4,800 mP·s.

Furthermore, an aqueous surfactant solution, comprising 18 parts of a 28% aqueous solution of stearyltrimethylammonium chloride, which was a cationic surfactant, 307 parts of water, and 2.5 parts of isopropyl alcohol, was added to the above toluene solution of grafted polymer (b), and they were mixed and stirred, thereby emulsified, at 40° C. for 20 minutes, thus obtaining a premixed solution.

Next, a fine dispersion was obtained by once press-feeding the above premixed solution under a pressure of 500 kg/cm² with Microfluidizer (made by Microfluidics Co., Ltd.) which was a high pressure homogenizer.

Toluene was removed from the resultant fine dispersion by heating under vacuum (50–60° C./220 mmHg), thus obtaining an aqueous polymer dispersion. The ratio "(standard deviation of volume-average particle diameter)/(volume-average particle diameter)", the volume-average particle diameter, and the solid content of grafted polymer (b) in this aqueous polymer dispersion were 0.25, 0.24 μm, and 26% respectively.

SYNTHESIS EXAMPLE 2

An aqueous polymer dispersion was obtained in the same way as of Synthesis Example 1 except that the toluene solution of polyethylenimine was changed to a toluene solution of polyethylenimine as prepared from 15 parts of polyethylenimine (weight-average molecular weight=1,800) as synthesized in the same way as of Synthesis Example 1. Incidentally, the viscosity of the resultant 40% toluene solution of grafted polymer (b) was 10 mP·s. In addition, the ratio "(standard deviation of volume-average particle diameter)/(volume-average particle diameter)", the volume-average particle diameter, and the solid content of grafted polymer (b) in the aqueous polymer dispersion were 0.3, 0.20 μm, and 26% respectively.

SYNTHESIS EXAMPLE 3

An aqueous polymer dispersion was obtained in the same way as of Synthesis Example 2 except that the polyethylenimine was changed to a polyethylenimine (weight-average molecular weight=10,000) as synthesized in the same way as of Synthesis Example 1. Incidentally, the viscosity of the resultant 40% toluene solution of grafted polymer (b) was 14 mP·s. In addition, the ratio "(standard deviation of volume-average particle diameter)/(volume-average particle diameter)", the volume-average particle diameter, and the solid content of grafted polymer (b) in the aqueous polymer dispersion were 0.25, 0.24 μm, and 26% respectively.

SYNTHESIS EXAMPLE 4

An aqueous polymer dispersion was obtained in the same way as of Synthesis Example 2 except that the polyethylenimine was changed to a polyethylenimine (weight-average molecular weight=33,000) as synthesized in the same way as of Synthesis Example 1. Incidentally, the viscosity of the resultant 40% toluene solution of grafted polymer (b) was 57 mP·s. In addition, the ratio "(standard deviation of volume-average particle diameter)/(volume-average particle diameter)", the volume-average particle diameter, and the solid content of grafted polymer (b) in the aqueous polymer dispersion were 0.25, 0.24 μm, and 26% respectively.

SYNTHESIS EXAMPLE 5

An aqueous polymer dispersion was obtained in the same way as of Synthesis Example 2 except that the polyethylenimine was changed to a polyethylenimine (weight-average molecular weight=70,000) as synthesized in the same way as of Synthesis Example 1. Incidentally, the viscosity of the resultant 40% toluene solution of grafted polymer (b) was 520 mP·s. In addition, the ratio "(standard deviation of volume-average particle diameter)/(volume-average particle diameter)", the volume-average particle diameter, and the solid content of grafted polymer (b) in the aqueous polymer dispersion were 0.25, 0.24 μm, and 26% respectively.

SYNTHESIS EXAMPLE 6

An aqueous polymer dispersion was obtained in the same way as of Synthesis Example 1 except that the press-feeding with Microfluidizer (made by Microfluidics Co., Ltd.), which was a high pressure homogenizer, was carried out twice. The ratio "(standard deviation of volume-average particle diameter)/(volume-average particle diameter)", the volume-average particle diameter, and the solid content of grafted polymer (b) in the aqueous polymer dispersion were 0.28, 0.19 μm, and 26% respectively.

SYNTHESIS EXAMPLE 7

An aqueous polymer dispersion was obtained in the same way as of Synthesis Example 1 except that the Microfluidizer, which was a high pressure homogenizer, was replaced with Clear Mix CLM-0.8S (made by M Technique Co., Ltd.), which was a common homogenizer, to carry out a dispersing treatment by stirring at 8,000 rpm for 30 minutes. The ratio "(standard deviation of volume-average particle diameter)/(volume-average particle diameter)", the volume-average particle diameter, and the solid content of grafted polymer (b) in the aqueous polymer dispersion were 0.48, 0.50 μm, and 26% respectively.

SYNTHESIS EXAMPLE 8

An aqueous polymer dispersion was obtained in the same way as of Synthesis Example 7 except that the dispersing treatment by stirring was carried out for 5 minutes. The ratio "(standard deviation of volume-average particle diameter)/(volume-average particle diameter)", the volume-average particle diameter, and the solid content of grafted polymer (b) in the aqueous polymer dispersion were 0.69, 2.0 μm, and 26% respectively.

SYNTHESIS EXAMPLE 9

A xylene solution of a product by partial saponification of poly(vinyl acetate) was obtained in the same way as of Synthesis Example 1 except that poly(vinyl acetate) (polymerization degree=200, saponification degree=98 mol %) and 172.5 parts of xylene were used. Then, an aqueous polymer dispersion was obtained in the same way as of Synthesis Example 1 except that 100 parts of octadecyl isocyanate was added to the xylene solution of the product by partial saponification of poly(vinyl acetate) under heat reflux over a period of 2 hours, and the reflux was then continued for another 24 hours. Incidentally, the viscosity of a 40% toluene solution of formed grafted polymer (b), as obtained by solvent displacement of xylene with toluene, was 30 mP·s. In addition, the ratio "(standard deviation of volume-average particle diameter)/(volume-average particle diameter)", the volume-average particle diameter, and the solid content of grafted polymer (b) in the aqueous polymer dispersion were 0.25, 0.24 μm, and 26% respectively.

SYNTHESIS EXAMPLE 10

An aqueous polymer dispersion was obtained in the same way as of Synthesis Example 9 except that the product by partial saponification of poly(vinyl acetate) was changed to a product by partial saponification of poly(vinyl acetate) (polymerization degree=1,000, saponification degree=98 mol %). Incidentally, the viscosity of the resultant 40% toluene solution of grafted polymer (b) was 220 mP·s. In addition, the ratio "(standard deviation of volume-average particle diameter)/(volume-average particle diameter)", the volume-average particle diameter, and the solid content of grafted polymer (b) in the aqueous polymer dispersion were 0.25, 0.24 μm, and 26% respectively.

SYNTHESIS EXAMPLE 11

An aqueous polymer dispersion was obtained in the same way as of Synthesis Example 9 except that the product by partial saponification of poly(vinyl acetate) was changed to a product by partial saponification of poly(vinyl acetate) (polymerization degree=3,500, saponification degree=98 mol %). Incidentally, the viscosity of the resultant 40% toluene solution of grafted polymer (b) was 11,000 mP·s. In addition, the ratio "(standard deviation of volume-average particle diameter)/(volume-average particle diameter)", the volume-average particle diameter, and the solid content of grafted polymer (b) in the aqueous polymer dispersion were 0.25, 0.24 μm, and 26% respectively.

SYNTHESIS EXAMPLE 12

An aqueous polymer dispersion was obtained in the same way as of Synthesis Example 10 except that the Microfluidizer, which was a high pressure homogenizer, was replaced with Clear Mix CLM-0.8S (made by M Technique Co., Ltd.), which was a common homogenizer, to carry out a dispersing treatment by stirring at 8,000 rpm for 30 minutes. The ratio "(standard deviation of volume-average particle diameter)/(volume-average particle diameter)", the volume-average particle diameter, and the solid content of grafted polymer (b) in the aqueous polymer dispersion were 0.48, 0.50 μm, and 26% respectively.

SYNTHESIS EXAMPLE 13

Fifty parts of hydroxyethyl methacrylate, as purified by distillation, and 159.8 parts of toluene were placed into the same reaction vessel as used in Synthesis Example 1. Thereto, 113.5 parts of octadecyl isocyanate was added at 50° C. over a period of 1 hour, and then the mixture was heated at 60° C. for 2 hours, thus obtaining a compound by an addition reaction of octadecyl isocyanate to hydroxyethyl methacrylate.

A solution, as prepared by dissolving 1.6 parts of an organic peroxide (Perbutyl-O, made by NOF CORPORATION) into 87.9 parts of toluene, was added to the resultant toluene solution of the above compound at 80° C. over a period of 2.5 hours, and then the mixture was heated at 100° C. for 2 hours, thus obtaining a toluene solution of grafted polymer (b) with such a structure that octadecyl isocyanate was added to poly(hydroxyethyl methacrylate). Incidentally, the viscosity of the resultant 40% toluene solution of grafted polymer (b) was 2,000 mP·s.

An aqueous polymer dispersion was obtained from the above toluene solution of grafted polymer (b) in the same way as of Synthesis Example 1. The ratio "(standard deviation of volume-average particle diameter)/(volume-average particle diameter)", the volume-average particle diameter, and the solid content of grafted polymer (b) in this aqueous polymer dispersion were 0.25, 0.24 μm, and 26% respectively.

SYNTHESIS EXAMPLE 14

An aqueous polymer dispersion was obtained in the same way as of Synthesis Example 13 except that the Microfluidizer, which was a high pressure homogenizer, was replaced with Clear Mix CLM-0.8S (made by M Technique Co., Ltd.), which was a common homogenizer, to carry out a dispersing treatment by stirring at 8,000 rpm for 30 minutes. The ratio "(standard deviation of volume-average particle diameter)/(volume-average particle diameter)", the volume-average particle diameter, and the solid content of grafted polymer (b) in the aqueous polymer dispersion were 0.48, 0.50 μm, and 26% respectively.

SYNTHESIS EXAMPLE 15

A xylene solution of grafted polymer (b), having such a structure that octadecyl isocyanate was added to a product by partial saponification of poly(vinyl acetate) (polymerization degree=1,800, saponification degree=88 mol %), was obtained in the same way as of Synthesis Example 9 except that 10 parts of the above product by partial saponification of polyvinyl acetate), 98 parts of xylene, and 55 parts of octadecyl isocyanate were used. This xylene solution of grafted polymer (b) had a solid content of 40%.

EXAMPLE 1

One hundred parts of the aqueous polymer dispersion, as obtained in Synthesis Example 1, was diluted with 4,503 parts of a 10% aqueous isopropyl alcohol solution, thereby obtaining a release agent with a solid content of 0.6%. The evaluation results are shown as Example 1 in Table 1.

EXAMPLE 2

Twenty-six parts of an emulsion of an ethylene-vinyl acetate-acrylic acid copolymer (Hytec E-7500, solid content=30%, made by Toho Chemical Industry Co., Ltd.), which was a carboxyl-group-containing polyolefin, was added to 100 parts of the aqueous polymer dispersion, as obtained in Synthesis Example 1, and then the mixture was diluted with 5,507 parts of a 10% aqueous isopropyl alcohol solution, thereby obtaining a release agent with a solid content of 0.6%. The evaluation results are shown as Example 2 in Table 1.

EXAMPLES 3 TO 8

Release agents with a solid content of 0.6% were obtained in the same way as of Example 1 except that the aqueous polymer dispersion was changed to those which were obtained in Synthesis Examples 6, 4, 5, 10, 11, and 13 respectively. The evaluation results are shown as Examples 3 to 8 in Table 1.

COMPARATIVE EXAMPLES 1 AND 2

Release agents with a solid content of 0.6% were obtained in the same way as of Example 1 except that the aqueous polymer dispersion was changed to those which were obtained in Synthesis Examples 2 and 3 respectively. The evaluation results are shown as Comparative Examples 1 and 2 in Table 2.

COMPARATIVE EXAMPLE 3

A release agent with a solid content of 0.6% was obtained in the same way as of Example 2 except that the aqueous polymer dispersion was changed to an aqueous polymer dispersion as obtained in Synthesis Example 3. The evaluation results are shown as Comparative Example 3 in Table 2.

COMPARATIVE EXAMPLES 4 TO 8

Release agents with a solid content of 0.6% were obtained in the same way as of Example 1 except that the aqueous polymer dispersion was changed to those which were obtained in Synthesis Examples 7, 8, 9, 12, and 14 respectively. The evaluation results are shown as Comparative Examples 4 to 8 in Table 2.

REFERENTIAL EXAMPLE

One hundred parts of the xylene solution of grafted polymer (b), as obtained in Synthesis Example 15, was diluted with 6,567 parts of xylene, thereby obtaining a release agent with a solid content of 0.6%. The evaluation results are shown as Referential Example in Table 2.

TABLE 1

| Examples | | Example 1 | Example 2 | Example 3 | Example 4 | Example 5 | Example 6 | Example 7 | Example 8 |
|---|---|---|---|---|---|---|---|---|---|
| Synthesis Examples | | Synthesis Example 1 (PEI) | Synthesis Example 1 (PEI) | Synthesis Example 6 (PEI) | Synthesis Example 4 (PEI) | Synthesis Example 5 (PEI) | Synthesis Example 10 (PVA) | Synthesis Example 11 (PVA) | Synthesis Example 13 (P-HEMA) |
| Weight-average molecular weight of backbone polymer (a) | | 290,000 | 290,000 | 290,000 | 33,000 | 70,000 | — (polymerization degree = 1,000) | — (polymerization degree = 3,500) | — |
| Viscosity of grafted polymer (b) as diluted (mP · s) | | 4,800 | 4,800 | 4,800 | 57 | 520 | 220 | 11,000 | 2,000 |
| Emulsification dispersing machine | | High pressure homogenizer | High pressure homogenizer | High pressure homogenizer | High pressure homogenizer | High pressure homogenizer | High pressure homogenizer | High pressure homogenizer | High pressure homogenizer |
| Acid-containing polyolefin | | — | Added | — | — | — | — | — | — |
| Grafted polymer (b) | Volume-average particle diameter (μm) | 0.24 | 0.24 | 0.19 | 0.24 | 0.24 | 0.24 | 0.24 | 0.24 |
| | Standard deviation (nm) | 60 | 60 | 53 | 60 | 60 | 60 | 60 | 60 |

TABLE 1-continued

| Examples | | Example 1 | Example 2 | Example 3 | Example 4 | Example 5 | Example 6 | Example 7 | Example 8 |
|---|---|---|---|---|---|---|---|---|---|
| | Standard deviation/Volume-average particle diameter | 0.25 | 0.25 | 0.28 | 0.25 | 0.25 | 0.25 | 0.25 | 0.25 |
| Emulsion stability | | A | A | A | A | A | A | A | A |
| Appearance (transparency) of coating film | | A | A | A | A | A | A | A | A |
| Writability | | A | A | A | A | A | B | B | B |
| Release resistance (g/25 mm) | Initial | 160 | 160 | 160 | 160 | 160 | 160 | 160 | 160 |
| | After preservation at high temperature | 240 | 230 | 230 | 240 | 240 | 230 | 230 | 240 |
| Residual adhesion (g/25 mm) | Initial | 1,590 | 1,600 | 1,600 | 1,600 | 1,600 | 1,590 | 1,590 | 1,600 |
| | After preservation at high temperature | 1,030 | 1,080 | 1,040 | 970 | 990 | 970 | 1,010 | 1,030 |
| | (Heat resistance index) | (95) | (100) | (96) | (90) | (92) | (90) | (94) | (95) |

TABLE 2

| Comparative Examples/Referential Example | | Comparative Example 1 | Comparative Example 2 | Comparative Example 3 | Comparative Example 4 | Comparative Example 5 | Comparative Example 6 | Comparative Example 7 | Comparative Example 8 | Referential Example |
|---|---|---|---|---|---|---|---|---|---|---|
| Synthesis Examples | | Synthesis Example 2 (PEI) | Synthesis Example 3 (PEI) | Synthesis Example 3 (PEI) | Synthesis Example 7 (PEI) | Synthesis Example 8 (PEI) | Synthesis Example 9 (PVA) | Synthesis Example 12 (PVA) | Synthesis Example 14 (P-HEMA) | Synthesis Example 15 (PVA) |
| Weight-average molecular weight of backbone polymer (a) | | 1,800 | 10,000 | 10,000 | 290,000 | 290,000 | (polymerization degree = 200) | (polymerization degree = 1,000) | — | — |
| Viscosity of grafted polymer (b) as diluted (mP·s) | | 10 | 14 | 14 | 4,800 | 4,800 | 30 | 220 | 2,000 | — |
| Emulsification dispersing machine | | High pressure homogenizer | High pressure homogenizer | High pressure homogenizer | Homogenizer | Homogenizer | High pressure homogenizer | Homogenizer | Homogenizer | — |
| Acid-containing polyolefin | | — | — | Added | — | — | — | — | — | — |
| Grafted Polymer (b) | Volume-average particle diameter (μm) | 0.20 | 0.24 | 0.24 | 0.50 | 2.0 | 0.24 | 0.50 | 0.50 | — |
| | Standard deviation (nm) | 60 | 60 | 60 | 240 | 1,380 | 60 | 240 | 240 | — |
| | Standard deviation/Volume-average particle diameter | 0.30 | 0.25 | 0.25 | 0.48 | 0.69 | 0.25 | 0.48 | 0.48 | — |
| Emulsion stability | | A | A | A | A | B | A | A | A | — |
| Appearance (transparency) of coating film | | A | A | A | B | B | A | B | B | A |
| Writability | | A | A | A | A | A | B | B | B | B |
| Release resistance (g/25 mm) | Initial | 160 | 160 | 160 | 160 | 180 | 160 | 160 | 160 | 160 |
| | After preservation at high temperature | 420 | 280 | 240 | 250 | 280 | 240 | 280 | 280 | 220 |
| Residual adhesion (g/25 mm) | Initial | 1,500 | 1,600 | 1,600 | 1,600 | 1,500 | 1,600 | 1,600 | 1,600 | 1,600 |
| | After preservation at high temperature | 490 | 760 | 800 | 830 | 740 | 760 | 830 | 830 | 1,080 |
| | (Heat resistance index) | (45) | (70) | (74) | (77) | (69) | (70) | (77) | (77) | (standard value) |

The superiority of the releasability was judged by comparison with the organic solvent base release agent of Referential Example, which agent comprises the long-chain alkyl grafted polymer and is known to generally have good heat resistance. As to the heat resistance, the release resistance is almost the same as the value of the organic solvent base release agent (±20 g/25 mm), and the heat resistance index is preferably not lower than 90%, more preferably not lower than 95%, of the value of the organic solvent base release agent. The case where the heat resistance index is lower than 90% of the value of the organic solvent base release agent is judged unfit for uses of the organic solvent base release agent as used under actual working environment or storage environment, therefore, unfit for practical use. Incidentally, the heat resistance index is a value as defined by the following equation:

Heat resistance index (%)
= ((residual adhesion of Example after preservation at high temperature)/(residual adhesion of Referential Example after preservation at high temperature))× 100

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An aqueous polymer dispersion, in which particles of grafted polymer (b) are dispersed in water, wherein grafted polymer (b) includes backbone polymer (a) and a hydrocarbon group with not fewer than 8 carbon atoms as a side chain, with the aqueous polymer dispersion being characterized in that:

backbone polymer (a) has a weight-average molecular weight of not less than 20,000, wherein backbone polymer (a) is at least one member selected from the group consisting of polyamines and polyols, and the particles of grafted polymer (b) are finely dispersed in water to have a volume-average particle diameter less than 0.3 pm by a process comprising the step of subjecting the grafted polymer (b) to a finely dispersing treatment together with water.

2. An aqueous polymer dispersion according to claim 1, wherein grafted polymer (b) is finely dispersed in water to have a ratio "(standard deviation of volume-average particle diameter)/(volume-average particle diameter)" of not higher than 0.5 as well as the volume-average particle diameter less than 0.3 μm.

3. An aqueous polymer dispersion, in which particles of grafted polymer (b) are dispersed in water, wherein grafted polymer (b) includes backbone polymer (a) and a hydrocarbon group with not fewer than 8 carbon atoms as a side chain, with the aqueous polymer dispersion being characterized in that:

wherein backbone polymer (a) is at least one member selected from the group consisting of polyarnines and polyols, grafted polymer (b) has a viscosity of not lower than 50 mP·s at 60° C. in the form of a toluene solution as diluted to 40 weight %, and the particles of grafted polymer (b) are finely dispersed in water to have a volume-average particle diameter less than 0.3 μm.

4. An aqueous polymer dispersion according to claim 3, wherein grafted polymer (b) is finely dispersed in water to have a ratio "(standard deviation of volume-average particle diameter)/(volume-average particle diameter)" of not higher than 0.5 as well as the volume-average particle diameter less than 0.3 μm.

5. An aqueous release agent, comprising the aqueous polymer dispersion as recited in claim 1.

6. An aqueous release agent according to claim 5, which further comprises a carboxylic-acid-containing polyolefin.

7. An aqueous release agent, comprising the aqueous polymer dispersion as recited in claim 2.

8. An aqueous release agent according to claim 7, which further comprises a carboxylic-acid-containing polyolefin.

* * * * *